(12) United States Patent
Marks et al.

(10) Patent No.: US 8,462,049 B2
(45) Date of Patent: *Jun. 11, 2013

(54) APPARATUS AND METHOD FOR CONSTRUCTING AND UTILIZING A BEACON LOCATION DATABASE

(75) Inventors: David Allen Marks, Orinda, CA (US); Alexander James Serriere, Concord, CA (US)

(73) Assignee: Teecom, Oakland, CA (US)

( * ) Notice: Subject to any disclaimer, the term of this patent is extended or adjusted under 35 U.S.C. 154(b) by 55 days.

This patent is subject to a terminal disclaimer.

(21) Appl. No.: 13/165,563

(22) Filed: Jun. 21, 2011

(65) Prior Publication Data

US 2011/0282901 A1     Nov. 17, 2011

Related U.S. Application Data

(63) Continuation-in-part of application No. 12/562,875, filed on Sep. 18, 2009, now Pat. No. 8,188,921.

(51) Int. Cl.
   *G01S 3/02*     (2006.01)
(52) U.S. Cl.
   USPC .......................................................... 342/451
(58) Field of Classification Search
   USPC ........ 342/386, 463–465, 451, 458; 455/456.1
   See application file for complete search history.

(56) References Cited

U.S. PATENT DOCUMENTS

| | | | |
|---|---|---|---|
| 5,548,637 A * | 8/1996 | Heller et al. | 342/450 |
| 6,320,496 B1 | 11/2001 | Sokoler | |
| 7,433,694 B2 | 10/2008 | Morgan et al. | |
| 7,693,654 B1 | 4/2010 | Dietsch et al. | |
| 7,991,382 B1 | 8/2011 | Gunasekara | |
| 2003/0043073 A1 | 3/2003 | Gray et al. | |
| 2003/0085841 A1 | 5/2003 | Spilker et al. | |
| 2003/0115098 A1 | 6/2003 | Kang | |
| 2005/0135292 A1 | 6/2005 | Graumann | |
| 2006/0125693 A1 | 6/2006 | Recker | |
| 2007/0210961 A1 | 9/2007 | Romijn | |
| 2007/0270164 A1 | 11/2007 | Maier et al. | |
| 2008/0209011 A1 * | 8/2008 | Stremel et al. | 709/219 |
| 2009/0256744 A1 * | 10/2009 | Loomis et al. | 342/357.12 |
| 2009/0280835 A1 | 11/2009 | Males et al. | |
| 2010/0121488 A1 | 5/2010 | Lee et al. | |
| 2010/0315286 A1 | 12/2010 | Cerniar | |
| 2012/0208549 A1 * | 8/2012 | Lau et al. | 455/456.1 |

OTHER PUBLICATIONS

TEECOM Design Group. PCT US2010/049125, International Search Report and Written Opinion (Nov. 2, 2010).

* cited by examiner

*Primary Examiner* — Jack W Keith
*Assistant Examiner* — Fred H Mull
(74) *Attorney, Agent, or Firm* — Cooley LLP

(57) ABSTRACT

A computer readable storage medium includes executable instructions to associate wireless beacon positions within a building with physical position coordinates. Client device positions within the building are computed based upon the physical position coordinates. The client device positions are aggregated to form a client position database.

14 Claims, 6 Drawing Sheets

APPARATUS AND METHOD FOR CONSTRUCTING AND UTILIZING A BEACON LOCATION DATABASE

CROSS-REFERENCE TO RELATED APPLICATION

This application is a continuation-in-part of U.S. patent application Ser. No. 12/562,875, filed Sep. 18, 2009.

FIELD OF THE INVENTION

This invention relates generally to locating the position of a wireless electronic device. More particularly, this invention relates to a technique for constructing and utilizing a beacon location database for client device position discovery within a building.

BACKGROUND OF THE INVENTION

Rapidly increasing interest in location-based services has increased the demand for ever-more precise positioning systems. The Global Positioning System (GPS) has become a de facto standard for determining the position of people and objects anywhere on the planet. However, GPS has one major limitation: the weak signals do not propagate into buildings. Consequently, it would be desirable to develop techniques that allow for device position discovery within a building.

SUMMARY OF THE INVENTION

A computer readable storage medium includes executable instructions to associate wireless beacon positions within a building with physical position coordinates. Client device positions within the building are computed based upon the physical position coordinates. The client device positions are aggregated to form a client position database.

BRIEF DESCRIPTION OF THE FIGURES

The invention is more fully appreciated in connection with the following detailed description taken in conjunction with the accompanying drawings, in which.

Like reference numerals refer to corresponding parts throughout the several views of the drawings.

DETAILED DESCRIPTION OF THE INVENTION

Figure 1:
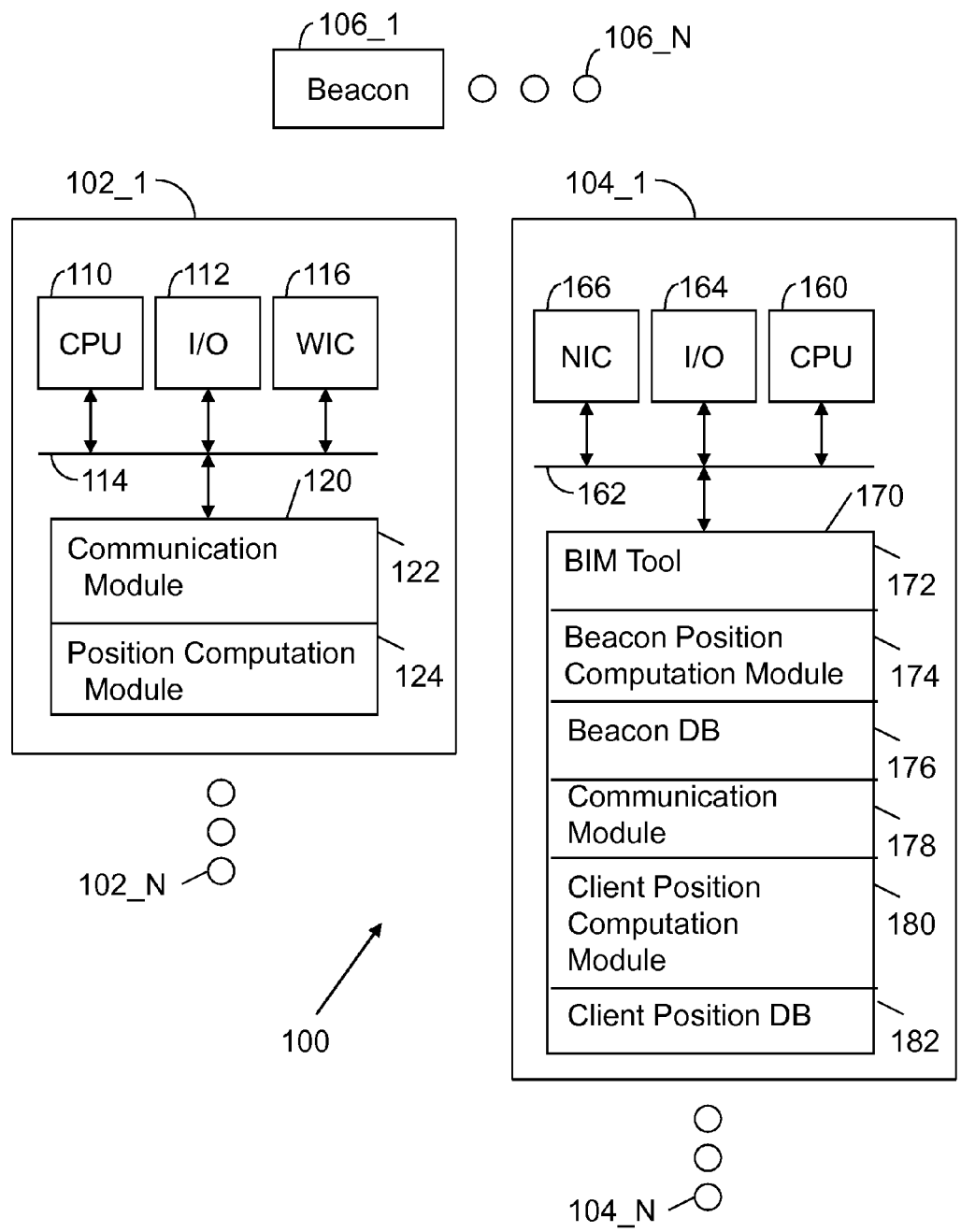
FIG. 1 illustrates a system configured in accordance with an embodiment of the invention.

FIG. 1 illustrates a system 100 configured in accordance with an embodiment of the invention. The system 100 includes at least one wireless client device 102 (illustrated as client devices 102_1 through 102_N) and at least one server 104 (illustrated as servers 104_1 through 104_N), which communicate in accordance with a wireless protocol. The system also includes a set of beacons 106_1 through 106_N, which support wireless communication in accordance with a wireless protocol. Each beacon is a transmitter that transmits continuous or periodic radio signals at a specified radio frequency. For example, in the field of Wi-Fi (wireless local area networks using the IEEE 802.11a/b/g/n specification), the term beacon references a specific data transmission from a wireless access point, which carries a service set identification (SSID), the channel number and security protocols. The transmission does not contain the link layer address of another Wi-Fi device so it can be received by any client.

Each client device 102 includes standard components, such as a central processing unit 110, which communicates with input/output devices 112 via a bus 114. The input/output devices 112 may include a keyboard and a display. A wireless interface circuit 116 is also connected to bus 114 to support wireless communications. A memory 120 is also connected to bus 114. The memory 120 includes executable instructions to support operations associated with the invention. For example, the memory 120 stores a communication module 122 to support wireless communication operations. The memory 120 also stores a position computation module 124, which performs operations that allow the client device to discover its position within a building.

The server 104 also includes standard components, such as a central processing unit 160 connected to input/output devices 164 via bus 162. A network interface circuit 166 is also connected to the bus 162. The network interface circuit 166 supports networked communications with either a wired or wireless device. The server 104 also includes a memory 170 connected to bus 162. The memory 170 stores executable instructions to implement operations of the invention. In one embodiment, the memory 170 stores a Building Information Modeling (BIM) tool. A BIM tool generates and manages building data. Typically, a BIM tool uses three-dimensional, real-time, dynamic building modeling software to increase productivity in building design and construction. The BIM tool characterizes building geometry, spatial relationships, geographic information, and quantities and properties of building components. In accordance with the invention, a BIM tool is supplemented to include beacon location information. In one embodiment, a beacon position computation module 174 supplements a BIM tool. The beacon position computation module 174 includes executable instructions to compute the physical location of beacons positioned within a building. In other words, a beacon's building position coordinates are extracted from construction documents or models associated with the BIM tool. Those coordinates are then transformed by the beacon position computation module to physical position coordinates (e.g., global positioning coordinates). This results in a beacon database 176 characterizing beacon position. The beacon database 176 may also include additional information to support client position resolution, as discussed below.

The memory 170 also stores a communication module 178 that supports communications with a wireless client 102. In one embodiment, the memory 170 also stores a client position computation module 180, which is used to compute the location of a client device within a building. The client position computation module 180 relies upon beacon information supplied by a client device. The client position computation module 180 may utilize more sophisticated positioning computations than are available on the client device. The client position may then be passed back to the client device. In addition, the client position computation module 180 may be used to populate a client position database 182. This database tracks the position of client devices within a building.

Figure 2:
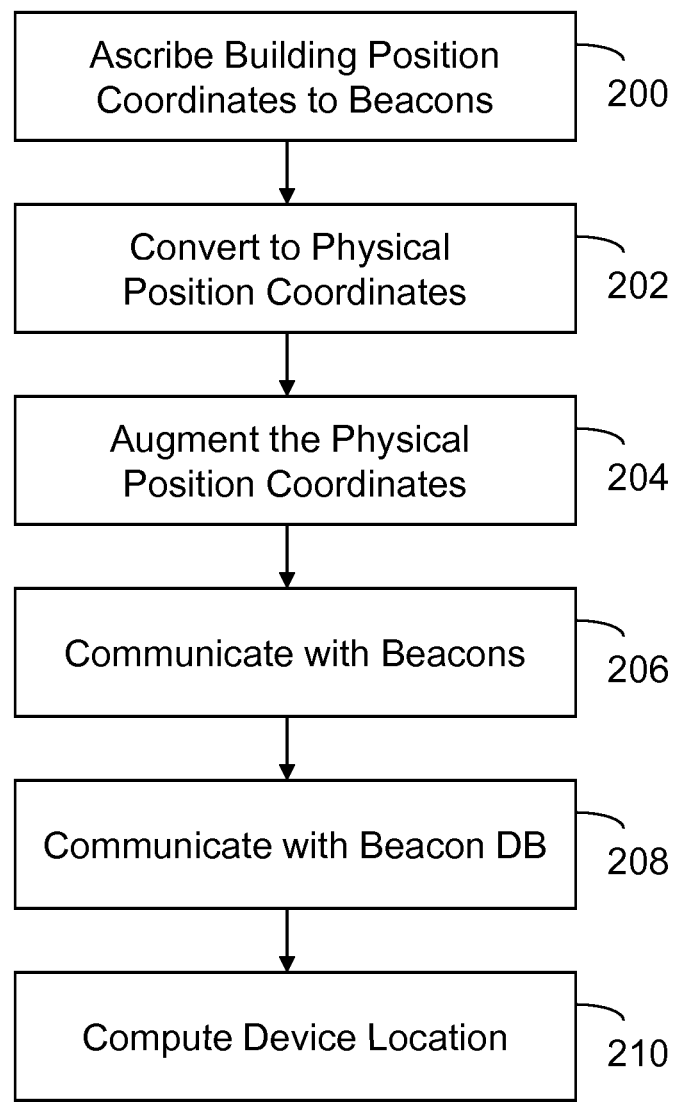
FIG. 2 illustrates processing operations associated with an embodiment of the invention.

FIG. 2 illustrates processing operations associated with an embodiment of the invention. Initially, building position coordinates are ascribed to beacons 200. Preferably, the BIM tool 172 is used to supply building position coordinates for the beacons. Alternately, a separate database may be constructed to store this information. The building position coordinates are then converted to physical position coordinates 202. Any number of conversion techniques may be used. In one embodiment of the invention, polar coordinates are normalized to a true north orientation. The conversion may also include ascribing Global Positioning System (GPS) coordinates to each beacon. The physical position coordinates are preferably augmented with at least one additional parameter that supports position resolution 204, as discussed below.

A client device 102 then communications with beacons 206. For example, the client device 102_1 of FIG. 1 may communicate with beacons 106_1 through 106_N, which are positioned within a building. The beacon database is also accessed 208. A version of the beacon database 176 may be in the client device. Alternately, relevant information from the beacon database 176 may be passed from the server 104_1 to the client device 102_1, as needed. Device location is then computed 210. Typically, the client device 102_1 will compute its position using the position computation module 124. In particular, the position computation module 124 relies upon the physical location of adjacent beacons to compute its location. Alternately, the client may pass information on adjacent beacons to the server 104, which computes the location of the client device and then passes the location information to the client device. The advantage of this approach is that it leverages the computational power of the server. Thus, more complex or dynamic position computations may be used to determine location. For example, the computations may take into account the construction materials in the building or use an advanced wireless heat map stored within the building information model. The server 104 may maintain a client position database 182 as it computes client locations. Alternately, the client position database 182 may be maintained by having each client device periodically report its position. The client position database 182 supports location based services. Thus, for example, a client device in a mall may receive information about a sale at a store in the mall.

The operations of the invention are more fully appreciated with reference to a specific example. The position of wireless beacons within a building are specified with a BIM tool. A typical BIM tool allows a user to attach computable information to the surfaces, edges and volumes that represent a building and the objects contained within the building.

Figure 3:
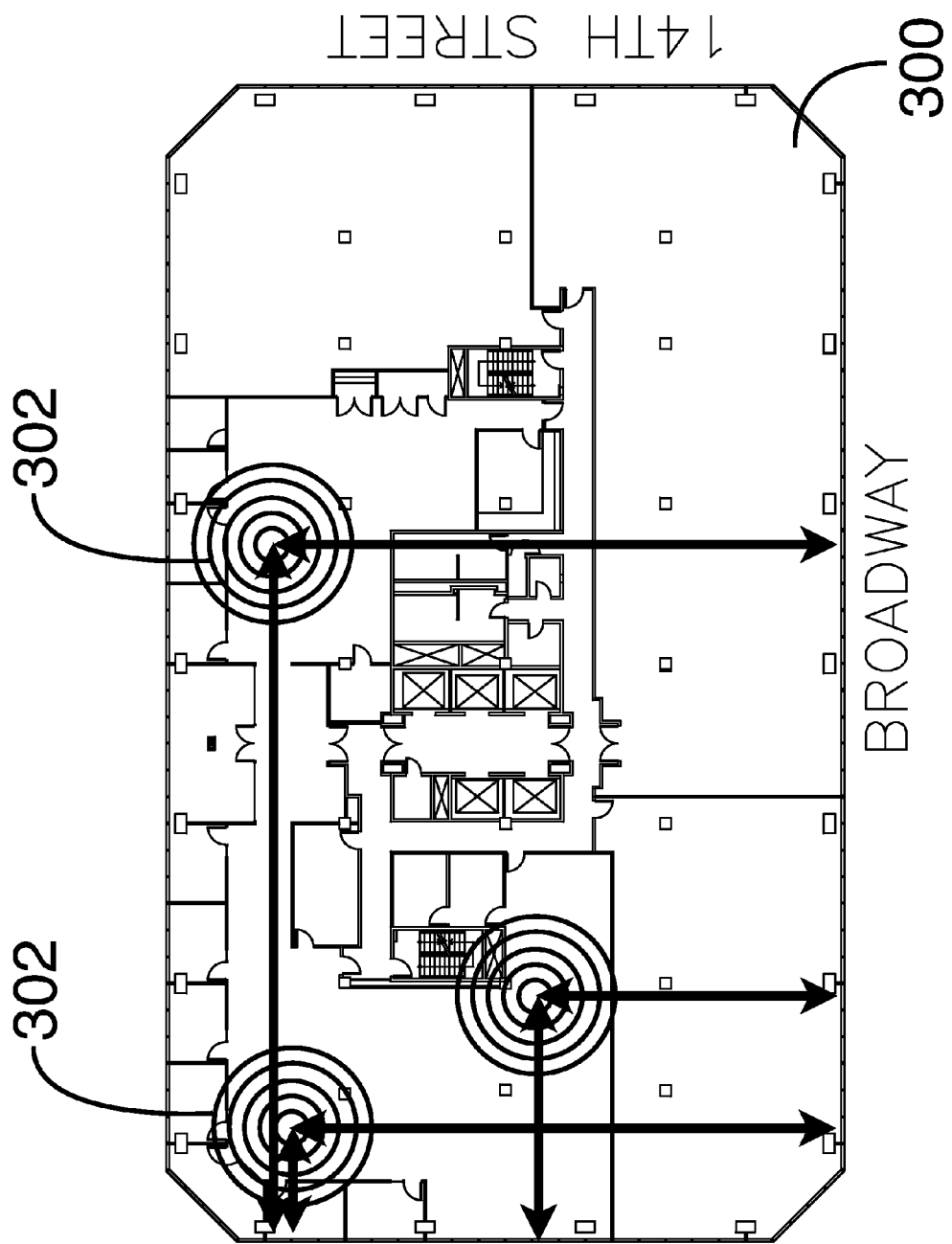
FIG. 3 illustrates beacon location information associated with a floor plan of a building.

FIG. 3 illustrates a floor plan 300 defined by a BIM tool. Drag and drop tools allow one to position beacons 302 on the floor plan 300. As a result, building position coordinates are automatically assigned to the beacons. Consider the following example with three beacons (AP1, AP2 and AP3) and associated coordinates.

| Beacon | X-Coordinate | Y-Coordinate | Z-Coordinate |
|---|---|---|---|
| AP1 | 6.86573624 | 93.3055607 | 70 |
| AP2 | 29.2206297 | 52.2223299 | 70 |
| AP3 | 106.001336 | 96.7549541 | 70 |

Figure 4:
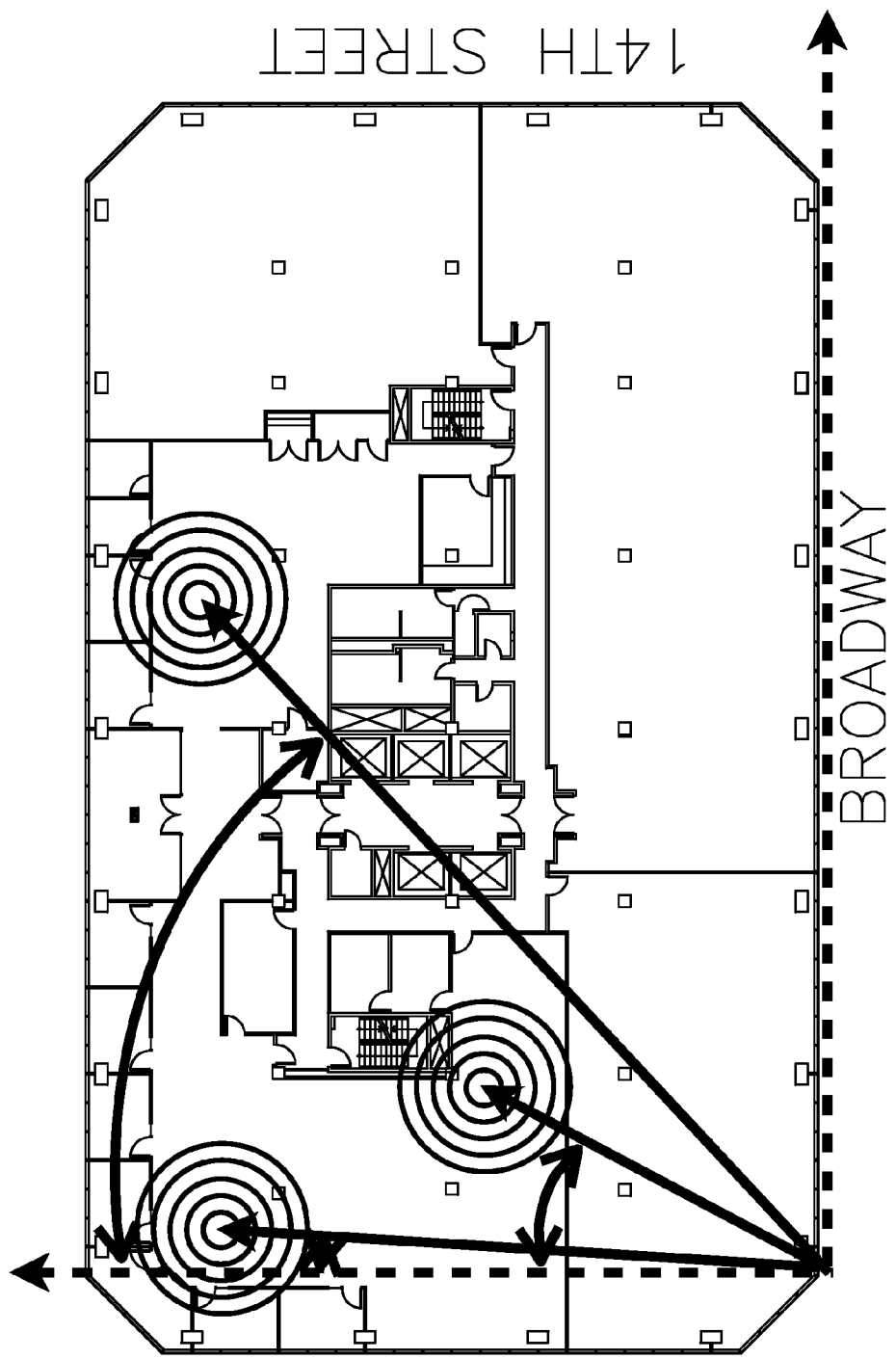
FIG. 4 illustrates the normalization of beacon location information in accordance with an embodiment of the invention.

The building position coordinates are then converted to physical position coordinates. In one embodiment, conversion is facilitated by using polar vectors. As shown in FIG. 4, beacon position is defined by the distance from the origin and the angle from vertical. This results in the following information.

| Beacon | Magnitude (ft.)<br>$=\sqrt{X^2+Y^2}$ | Bearing (°)<br>$=90 - \mathrm{atan2}(y/X)/\Pi*180$ |
|---|---|---|
| AP1 | 93.55782162 | 4.208431115 |
| AP2 | 59.84159874 | 29.22888144 |
| AP3 | 143.5193519 | 47.61107494 |

Figure 5:
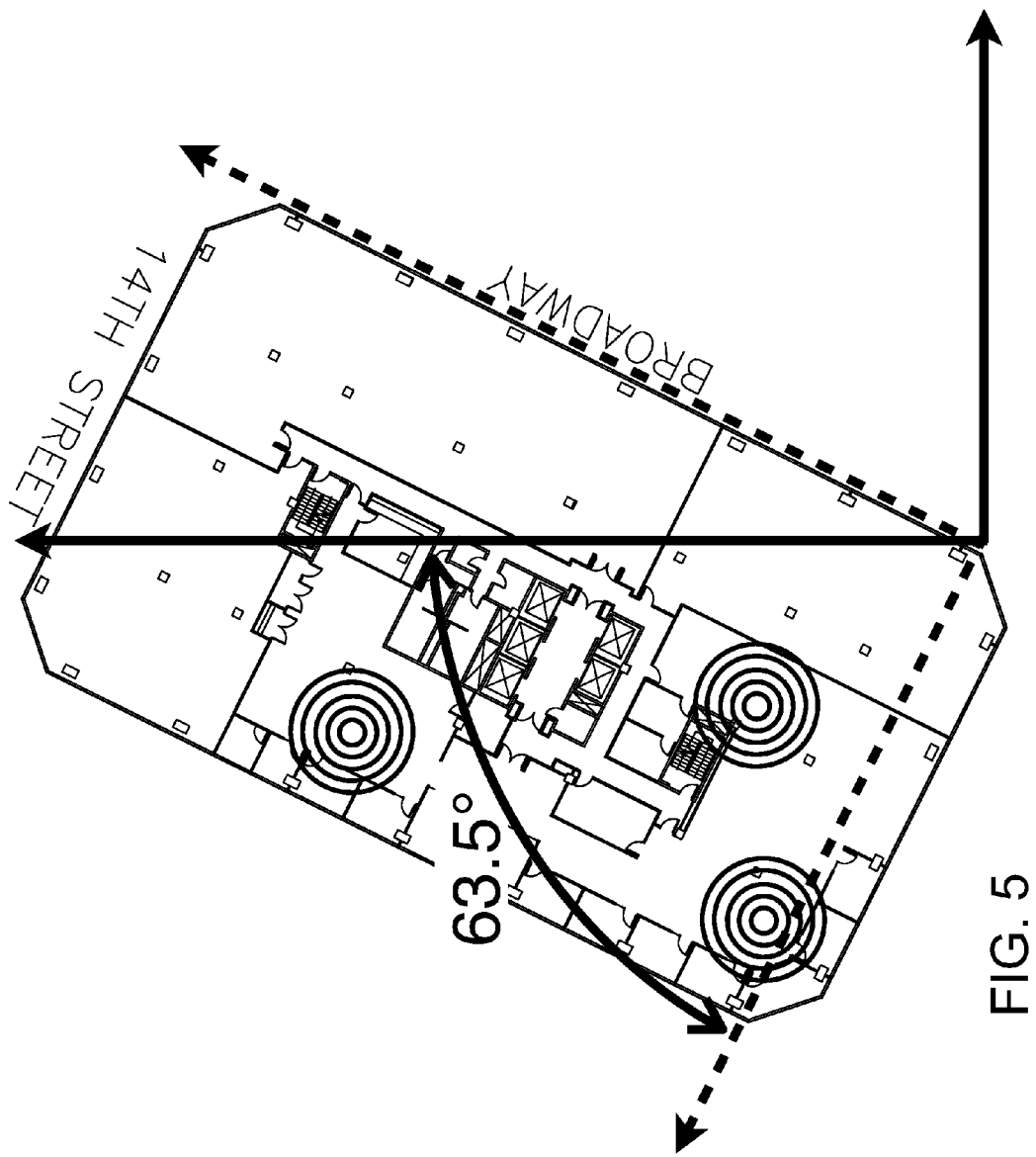
FIG. 5 illustrates the normalization of beacon location information in accordance with true north orientation in accordance with an embodiment of the invention.

The physical orientation is then determined with respect to a true north orientation, as shown in FIG. 5. A reference Global Positioning System (GPS) coordinate for the site is then used as the origin (0,0). In this example, the GPS coordinate is (37.8038630, −122.2718963). Using the calculated difference between true north and project north, the bearing angles are adjusted so that they are oriented to true north. In this example, an angle adjustment of 63.5° is required. This results in the following updated data.

| Beacon | Magnitude (ft.) | Bearing (°)<br>$=360 - 63.5 + \Theta$ |
|---|---|---|
| AP1 | 93.55782162 | 300.7153755 |
| AP2 | 59.84159874 | 325.7358258 |
| AP3 | 143.5193519 | 344.1180193 |

The GPS coordinates of the beacons are now computed from the polar vectors and the reference coordinate ($lat_1$, $lon_1$). This results in the following data.

| Beacon<br>R(radius of earth =<br>20,902,231 ft)<br>d = magnitude<br>Θ = bearing | Latitude<br>$=\mathrm{asin}(\sin(lat_1)\,*$<br>$\cos(d/R)+\cos(lat_1)*\sin$<br>$(d/R)*\cos(\Theta)$ | Longitude<br>$=lon_1 + \mathrm{atan2}(\sin(\Theta)\,*$<br>$\sin(d/R)*\cos(lat_1),$<br>$\cos(d/R) - \sin(lat_1)*\sin$<br>$(lat_2))$ |
|---|---|---|
| AP1 | 37.803994 | −122.2721753 |
| AP2 | 37.80399857 | −122.2720132 |
| AP3 | 37.80424139 | −122.2720326 |

Each beacon has a unique identifier. For example, in the case of a Wi-Fi access point, the unique identifier is its MAC address. The unique identifier is added to the beacon database 176. This may result in the following table.

| Beacon | MAC Address | Coordinates<br>(Latitude, Longitude, Altitude) |
|---|---|---|
| AP1 | 00:13:B0:05:18:F0 | (37.803994, −122.2721753, 70) |
| AP2 | 00:1C:50:05:1C:70 | (37.80399857, −122.2720132, 70) |
| AP3 | 00:1C:B0:05:61:C0 | (37.80424139, −122.2720326, 70) |

A client device within range of a beacon can query the database and retrieve the precise coordinates of the beacon. This information, coupled with signal strength allows the device to calculate its distance to the GPS coordinates. With information from at least two other beacons, the device can calculate its position. For example, a sensing radio in a client device detects and measures signals from nearby beacons. In the case of Wi-Fi access points, the MAC address of the beacon's radio is used to uniquely identify the detected radio signals since this information is automatically broadcast as part of the Wi-Fi specification. Other types of location beacons may broadcast on unique frequencies or broadcast other information unique to that beacon.

Once the signals have been uniquely identified and the strength of those signals has been measured, the position of the location beacon from which the signal originates is retrieved from the beacon database 176. In one embodiment, the beacon database 176 is a text file on the client device with each line of the file composed of the beacon's identifier, its latitude, its longitude, and its altitude. A positioning program can then search the text file for the unique identifier and retrieve the GPS coordinates of the beacon. Alternatively, the database can be accessed via the internet and the client device can connect to it remotely to retrieve the information.

With the measured signal strengths and the GPS coordinates of at least three location beacons, the client device can calculate its own position. First, the distance to each beacon is estimated. This can be achieved in any number of way. One approach is to use the free space path loss equation:

$$FSPL(dB) = 20 \log_{10}(d) + 20 \log_{10}(f) + 92.44$$

where d is the distance in meters f is the frequency of the signal in megahertz and the loss (FSPL) is the ratio of the beacon's power output to the received power. This does not take into account the antenna gains in the transmitter or receiver, nor does it account for additional losses due to obstructions. A more accurate method is to use a link budget calculation. A link budget is the accounting of all of the gains and losses from a transmitter through a medium to a receiver in a telecommunication system. The link budget accounts for the attenuation of the transmitted signal due to propagation, antenna gains, and miscellaneous losses. A simple link budget equation is:

$$\text{Received Power (dBm)} = \text{Transmitted Power (dBm)} + \text{Gains (dB)} - \text{Losses (dB)}$$

A still more accurate method is to rely upon a laboratory test to determine the correct equation for distance as a function of signal strength for every type of beacon. Finally, with the approximate distance to each beacon, the device can calculate its position using trilateration. Trilateration is a method for determining the intersection of three sphere surfaces given the centers and radii of the three spheres. A mathematical derivation for the solution of a three-dimensional trilateration problem can be found by taking the formulae for three spheres and setting them equal to one another.

The beacon database 176 may be supplemented to include additional parameters to support position resolution. This information may include a beacon manufacturer, a beacon model number, a beacon antenna design parameter, and a beacon power output parameter. The following table illustrates a beacon database with augmented information.

The foregoing table may include other information, such as an experimentally determined distance function. For example, each row may include a column defining a Received Power (dBm)=$f_x(d)$.

Various techniques may be used to exploit this information. For example, if the antenna design for a specific beacon is highly directional rather than omni-directional, this information can be accounted for in a more accurate position computation.

Figure 6:
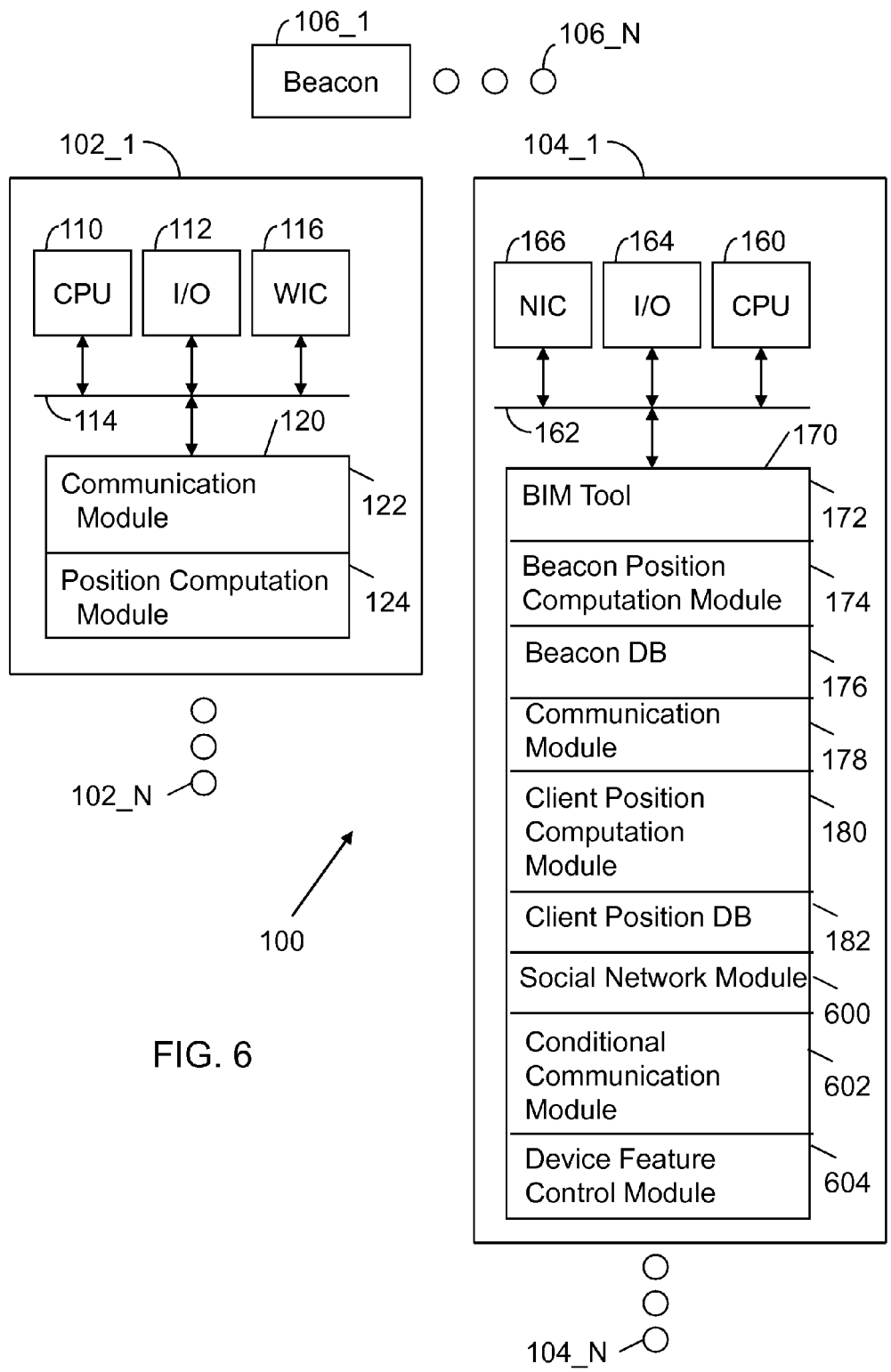
FIG. 6 illustrates a system configured in accordance with an alternate embodiment of the invention.

FIG. 6 illustrates the system of FIG. 1 augmented to utilize information in the client position database 182. In particular, the figure illustrates a social network module 600, a conditional communication module 602 and a device feature control module 604, each of which works in conjunction with the client position database 182 to provide added services to an individual within a building.

Those skilled in the art will appreciate that various forms of position data may be tracked in the client position database 182. For example, the client position database 182 may specify a path traversed through a building by a client device. The database may also specify temporal visitation segments along the path. That is, the database may specify how long a client stays at different positions along the path. Additional parameters may also be tracked, such as the number of times that a client returns to a specific locale within the building. Aggregated client data may be used to track the number of client devices within the building. This number may be contrasted with historic norms.

The social network module 600 analyzes social network data of users of client devices to identify socially connected individuals within the building. For example, the social network module 600 may access Facebook® or LinkedIn® social network data for a first user of a client device to determine if a second user of a client device within the building is associated with the first user. The social network module 600 may also be used to analyze social network data of users of the client devices to derive proposed social connections for individuals within a building. For example, the proposed social connections may be based upon frequent temporal overlap within the building and shared friends.

A conditional communication module 602 may operate with the social network module 600 to provide communications to a client. In one instance, the conditional communication module 602 is responsive to information from the social network module 600 and thereby provides a message to a client indicating a socially connected individual within the building or a proposed social connection within the building.

The conditional communication module 602 may send a message based upon conditional communication criteria, such as, if individual X is within the building between 9:00 am and 11 am, send notification Y. The notification or message may be a coupon or other incentive from a commercial establishment within the building.

The device feature control module 604 includes executable instructions to access the client position DB 182. The device

| MAC Address | Coordinates | Manufacturer | Model Number | Antenna Design | Power Output |
| --- | --- | --- | --- | --- | --- |
| 00:1C:B0:05:18:F0 | (37.803994, −122.2721753, 70) | Cisco | Aironet 1250 | Directional Patch | 200 mW |
| 00:1C:B0:05:1C:70 | (37.80399857, −122.2720132, 70) | Aruba | AP-120 | Omnidirectional Multi-band Dipole | 175 mW |
| 00:1C:B0:05:61:C0 | (37.80424139, −122.2720326, 70) | Meru | RS4000 | Directional | 110 mW | feature control module 604 then executes instructions to compare the client's location to a device feature prohibition table, such as the following table:

| Location   | Prohibited Device Feature(s) |
|------------|------------------------------|
| Location_1 | A, B                         |
| Location_N | X, Y, Z                      |

If a client is in a specified location and a prohibited device feature is defined, the device feature control module 604 sends a command to the device to disable the feature. For example, the device feature control module 604 may access a feature control table as follows:

| Device Type | Feature_1 Toggle Command | Feature_N Toggle Command |
|-------------|--------------------------|--------------------------|
| Device_1    | Command_A                | Command_B                |
| Device_N    | Command_Y                | Command_Z                |

As illustrated, the feature control table is populated with information from device manufacturers that allows the toggling on and off of a device feature. For example, the feature control table may be used to set a phone to silent mode when entering a theater. That is, the silent mode toggle command for the client device in the theater is read and is then sent to the client device. Alternately, the feature control table may be used to disable the ability to take photographs in a federal building or disable access to recording functions when in a courtroom. The feature may be subsequently enabled when the client leaves the specified location.

An embodiment of the present invention relates to a computer storage product with a computer readable storage medium having computer code thereon for performing various computer-implemented operations. The media and computer code may be those specially designed and constructed for the purposes of the present invention, or they may be of the kind well known and available to those having skill in the computer software arts. Examples of computer-readable media include, but are not limited to: magnetic media such as hard disks, floppy disks, and magnetic tape; optical media such as CD-ROMs, DVDs and holographic devices; magneto-optical media; and hardware devices that are specially configured to store and execute program code, such as application-specific integrated circuits ("ASICs"), programmable logic devices ("PLDs") and ROM and RAM devices. Examples of computer code include machine code, such as produced by a compiler, and files containing higher-level code that are executed by a computer using an interpreter. For example, an embodiment of the invention may be implemented using a general programming language, JAVA®, C++, or another object-oriented or non-object-oriented programming language and development tools. Another embodiment of the invention may be implemented in hardwired circuitry in place of, or in combination with, machine-executable software instructions.

The foregoing description, for purposes of explanation, used specific nomenclature to provide a thorough understanding of the invention. However, it will be apparent to one skilled in the art that specific details are not required in order to practice the invention. Thus, the foregoing descriptions of specific embodiments of the invention are presented for purposes of illustration and description. They are not intended to be exhaustive or to limit the invention to the precise forms disclosed; obviously, many modifications and variations are possible in view of the above teachings. The embodiments were chosen and described in order to best explain the principles of the invention and its practical applications, they thereby enable others skilled in the art to best utilize the invention and various embodiments with various modifications as are suited to the particular use contemplated. It is intended that the following claims and their equivalents define the scope of the invention.

The invention claimed is:

1. A non-transitory computer readable storage medium, comprising executable instructions to:
   access a building information modeling tool that provides a three-dimensional model of a building;
   ascribe building position coordinates to beacons within a building, wherein the building position coordinates express spatial relationships in the three-dimensional model of the building;
   convert the building position coordinates to physical position coordinates;
   augment the physical position coordinates with at least one additional parameter that supports position resolution;
   deliver the physical position coordinates and at least one additional parameter to a client device within the building;
   compute client device positions within the building based upon the physical position coordinates; and
   aggregate the client device positions to form a client position database.

2. The non-transitory computer readable storage medium of claim 1 wherein the client position database specifies a path traversed through the building by the client device.

3. The non-transitory computer readable storage medium of claim 2 wherein the client position database specifies temporal visitation segments along the path.

4. The non-transitory computer readable storage medium of claim 1 wherein the client position database specifies client locale return data.

5. The non-transitory computer readable storage medium of claim 1 wherein the client position database specifies a number of client devices within the building.

6. The non-transitory computer readable storage medium of claim 1 further comprising executable instructions to analyze social network data of users of the client devices to identify socially connected individuals within the building.

7. The non-transitory computer readable storage medium of claim 1 further comprising executable instructions to analyze social network data of users of the client devices and the client position database to derive proposed social connections.

8. The non-transitory computer readable storage medium of claim 1 further comprising executable instructions to send the client device a message based upon conditional communication criteria and information in the client position database.

9. The non-transitory computer readable storage medium of claim 8 wherein the conditional communication criteria specifies individual identity associated with a client device and client device position within the building.

10. The non-transitory computer readable storage medium of claim 1 further comprising executable instructions to control a feature of a client device.

11. The non-transitory computer readable storage medium of claim 10 wherein the executable instructions to control a feature of a client device include executable instructions to access a device feature prohibition table.

12. The non-transitory computer readable storage medium of claim 11 wherein the device feature prohibition table specifies a prohibited device feature for a specified location.

13. The non-transitory computer readable storage medium of claim 10 wherein the executable instructions to control a feature of a client device include executable instructions to access a feature control table.

14. The non-transitory computer readable storage medium of claim 13 wherein the feature control table specifies a feature toggle command for a specified device.

* * * * *